United States Patent [19]

Froessl

[11] Patent Number: 5,109,439
[45] Date of Patent: Apr. 28, 1992

[54] MASS DOCUMENT STORAGE AND RETRIEVAL SYSTEM

[76] Inventor: Horst Froessl, Gutenbergstrasse 2-4, D-6944 Hemsbach, Fed. Rep. of Germany

[21] Appl. No.: 536,769

[22] Filed: Jun. 12, 1990

[51] Int. Cl.⁵ ............................................. G06K 9/00
[52] U.S. Cl. ..................................... 382/61; 382/57; 364/963.1
[58] Field of Search ............... 382/57, 61; 364/225.4, 364/963, 963.1, 963.4

[56] References Cited

U.S. PATENT DOCUMENTS

| | | | |
|---|---|---|---|
| 4,358,824 | 11/1982 | Glickman et al. | 364/200 |
| 4,553,261 | 11/1985 | Froessl | 382/61 |
| 4,672,683 | 6/1987 | Matsueda | 382/57 |
| 4,748,678 | 5/1988 | Takeda et al. | 382/61 |
| 4,758,980 | 7/1988 | Tsunekawa et al. | 382/61 |
| 4,760,606 | 7/1988 | Lesnick et al. | 382/61 |
| 4,817,166 | 3/1989 | Gonzalez et al. | 382/1 |
| 4,933,979 | 6/1990 | Suzuki et al. | 382/61 |

Primary Examiner—Leo H. Boudreau
Assistant Examiner—David Fox
Attorney, Agent, or Firm—Walter C. Farley

[57] ABSTRACT

A sequence of documents is delivered to an optical scanner in which each document is scanned to form a digital image representation of the content of the document. In one embodiment, the image representation is converted into code (ASCII) and is automatically examined by data processing apparatus to select search words which meet predetermined criteria and by which the document can subsequently located. In another embodiment, the image is not converted. The search words are stored in a nonvolatile memory in code form and the entire document content is stored in mass storage, either in code or image form. Techniques for selecting the search words are disclosed.

21 Claims, 7 Drawing Sheets

MASS DOCUMENT STORAGE AND RETRIEVAL SYSTEM

This invention relates to a system for the mass storage of documents and to a method for automatically selecting search words by which the documents can be retrieved on the basis of the document content.

BACKGROUND OF THE INVENTION

Various systems are used for the mass storage and retrieval of the contents of documents including systems such as those disclosed in my earlier U.S. Pat. Nos. 4,273,440; 4,553,261; and 4,276,065. While these systems are indeed quite usable and effective, they generally require considerable human intervention. Other systems involve storage techniques which do not use the available technology to its best advantage and which have serious disadvantages as to speed of operation and efficiency. In this context, the term "mass storage" is used to mean storage of very large quantities of data in the order of, e.g., multiple megabytes, gigabytes or terabytes. Storage media such as optical disks are suitable for such storage although other media can be used.

Generally speaking, prior large-quantity storage systems employ one of the following approaches:

A. The content of each document is scanned by some form of optical device involving character recognition (generically, OCR) so that all or major parts of each document are converted into code (ASCII or the like) which code is then stored. Systems of this type allow full-text code searches to be conducted for words which appear in the documents. An advantage of this type of system is that indexing is not absolutely required because the full text of each document can be searched, allowing a document dealing with a specific topic or naming a specific person to be located without having to be concerned with whether the topic or person was named in the index. Such a system has the disadvantages that input tends to be rather slow because of the conversion time required and input also requires human supervision and editing, usually by a person who is trained at least enough to understand the content of the documents for error-checking purposes. Searching has also been slow if no index is established and, for that reason, indexing is often done. Also, the question of how to deal with non-word images (graphs, drawings, pictorial representations) must be dealt with in some way which differs from the techniques for handling text in many OCR conversion systems. Furthermore, such systems have no provision for offering for display to the user a list of relevant search words, should the user have need for such assistance.

B. The content of each document is scanned for the purpose of reducing the images of the document content to a form which can be stored as images, i.e., without any attempt to recognize or convert the content into ASCII or other code. This type of system has the obvious advantage that graphical images and text are handled together in the same way. Also, the content can be displayed in the same form as the original document, allowing one to display and refer to a reasonably faithful reproduction of the original at any time. In addition, rather rapid processing of documents and storage of the contents is possible because no OCR conversion is needed and it is not necessary for a person to check to see that conversion was proper. The disadvantages of such a system are that some indexing technique must be used. While it would be theoretically possible to conduct a pattern search to locate a specific word "match" in the stored images of a large number of documents, success is not likely unless the "searched for" word is presented in a font or typeface very similar to that used in the original document. Since such systems have had no way of identifying which font might have been used in the original document, a pattern search has a low probability of success and could not be relied upon. Creating an index has traditionally been a rather time consuming, labor-intensive task. Also, image storage systems (i.e., storing by using bit-mapping or line art or using Bezier models) typically require much more memory than storing the equivalent text in code, perhaps 25 times as much.

Various image data banks have come into existence but acceptance at this time is very slow mainly due to input and retrieval problems. Because of the above difficulties, mass storage systems mainly have been restricted to archive or library uses wherein retrieval speed is of relatively little significance or wherein the necessary human involvement for extensive indexing can be cost justified. There are, however, other contexts in which mass storage could be employed as a component of a larger and different document handling system if the above disadvantages could be overcome.

SUMMARY OF THE INVENTION

An object of the present invention is to provide a method of handling input documents, storing the contents of the documents and automatically creating a selection of search words for the stored documents with little or no human intervention.

A further object is to provide a method of machine-indexing contents of documents which are to be stored in image form in such a way that the documents can be retrieved.

Another object is to provide a method to display search words to users in an indexed or a non-indexed system.

Briefly described, the invention comprises a method of retrievably storing contents of a plurality of documents having images imprinted thereon comprising optically scanning the documents to form a representation of the images on the documents. A unique identification number can be assigned to each document and to the image representation of each document. Search words are automatically selected from each document to be used in locating the document from mass storage. The selected search words are converted to code, correlating the converted search words with the unique identification number of the document from which the search words were selected. The search words are stored in code, and the image representation of each document is stored in mass storage or the entire text is converted into ASCII or other code with the search words being retained in separate storage for display to users when desired.

It should be kept in mind that the invention contemplates three possible approaches which have their own advantages and disadvantages. In one approach, the text is "read" by a scanner or the like and kept in a bit-mapped or similar digital for, as it emerges from the scanner rather than being converted into ASCII or other code. Search words are extracted and converted into code but the main body of the text is stored (in mass storage) as an image. In the second approach, the entire document (to the extent possible) is converted, search words are selected and stored in code form, and the entire text is stored in code. In the third approach, the document is also entirely converted (to the extent possible) and search words are selected but the document is finally stored in image form. Except for the search words, the converted text is not saved in mass storage.

BRIEF DESCRIPTION OF THE DRAWINGS

In order to impart full understanding of the manner in which these and other objects are attained in accordance with the invention, particularly advantageous embodiments thereof will be described with reference to the accompanying drawings, which form part of this specification, and wherein.

DESCRIPTION OF THE PREFERRED EMBODIMENTS

The present invention will be described in the context of a system for handling incoming mail in an organization such as a corporation or government agency which has various departments and employees and which receives hundreds or thousands of pieces of correspondence daily. At present, such mail is commonly handled manually because there is no practical alternative. Either of two approaches is followed, depending on the size and general policies of the organization: in one approach, mail is distributed to departments, and perhaps even to individual addressees, before it is opened, to the extent that its addressee can be identified from the envelope; and in the other approach, the mail is opened in a central mail room and then distributed to the addressees In either case, considerable delay exists before the mail reaches the intended recipient. In addition, there is very little control over the tasks which are to be performed in response to the mail because a piece of mail may go to an individual without his or her supervisor having any way to track the response. Copying (i.e., making a paper copy) of each piece of mail for the supervisor is, of course, unnecessarily wasteful. The present system can be used to store and distribute such incoming mail documents.

Figure 1A:
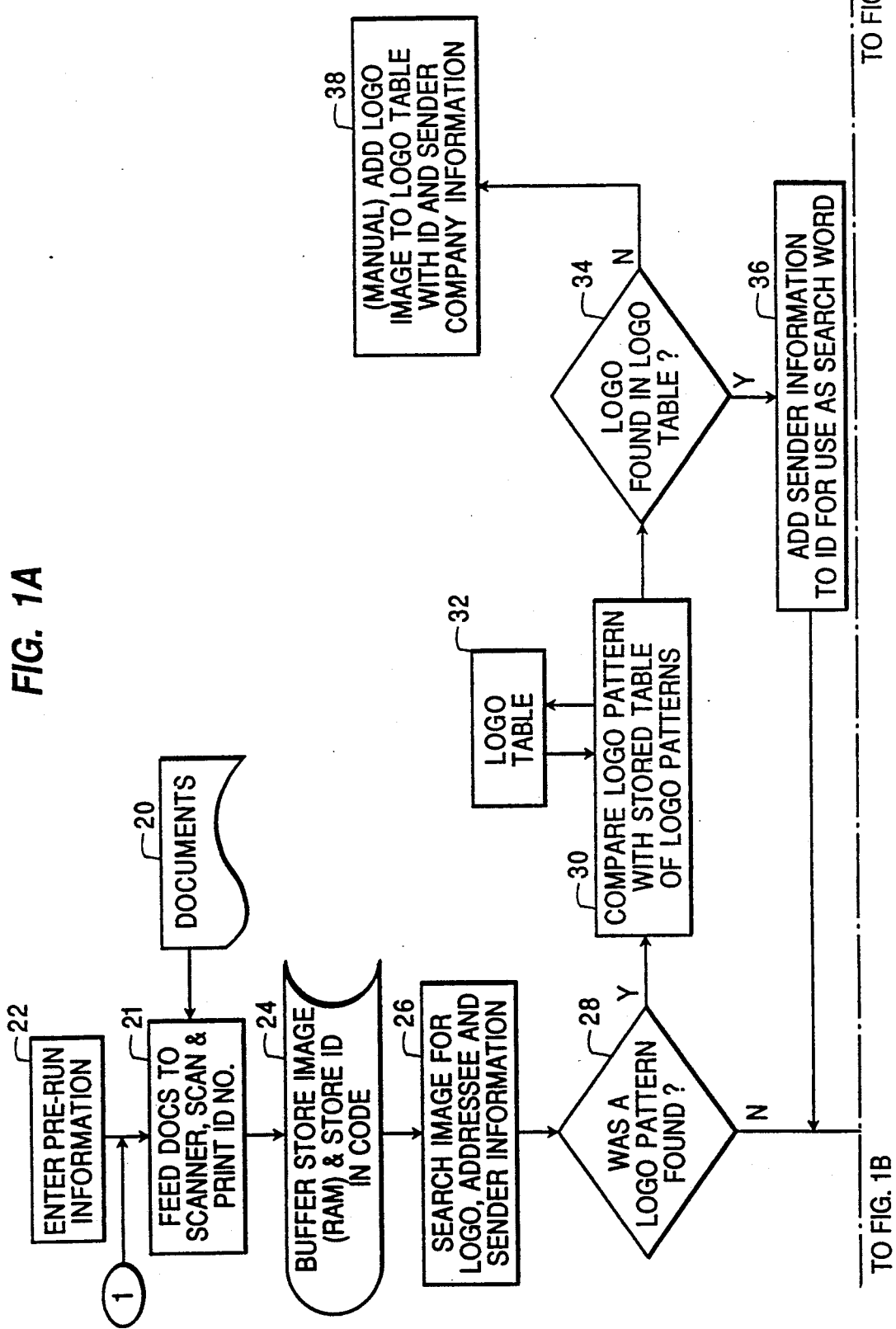
FIGS. 1A and 1B, taken together, constitute a flow diagram illustrating the overall steps of a first embodiment of a document processing method in accordance with the invention.
Figure 1B:
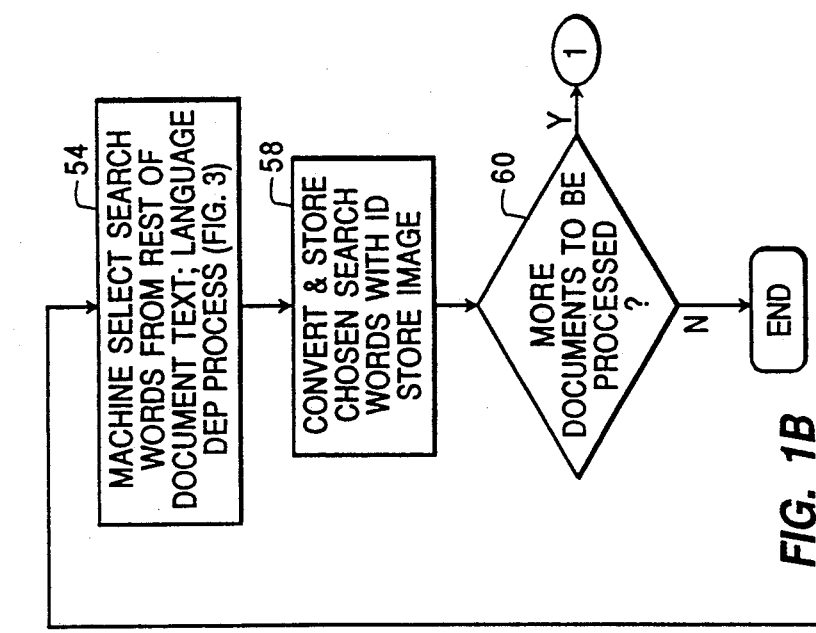
Figure 1B:
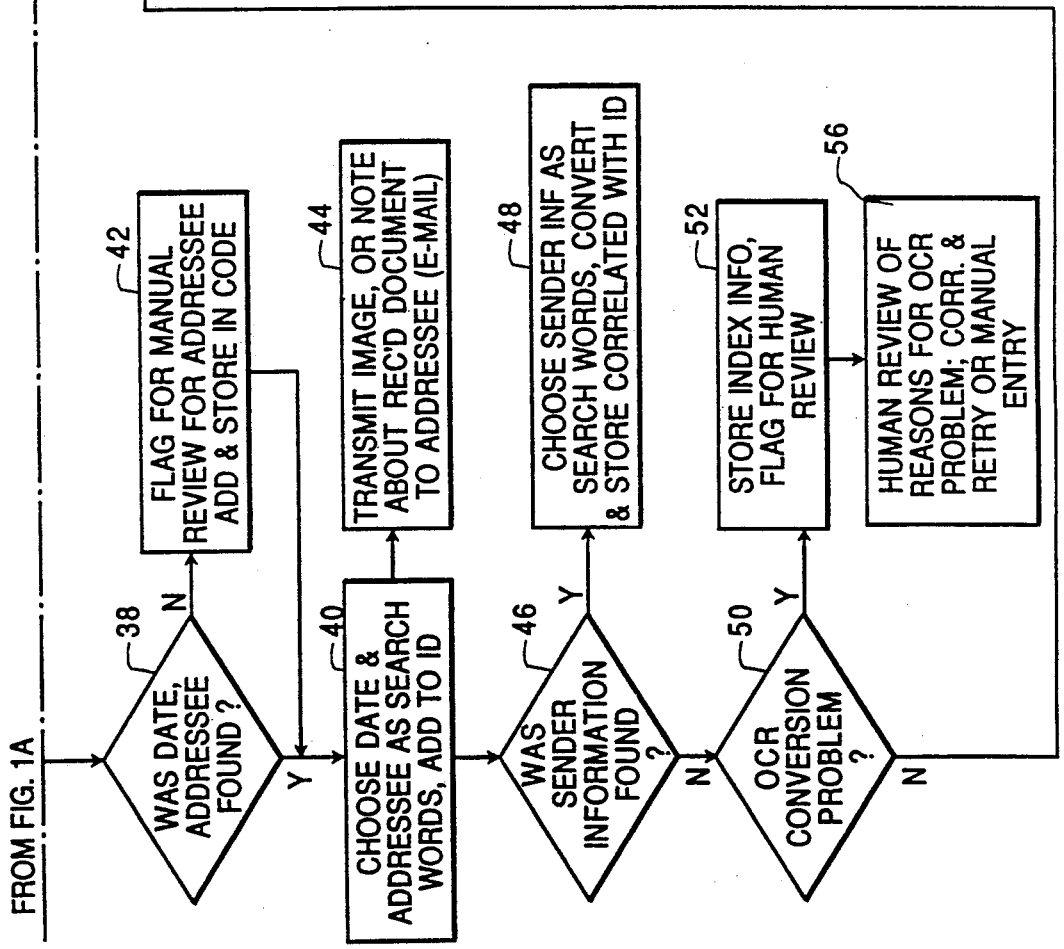

Referring first to FIG. 1, at the beginning of the process of the present invention, each incoming document 20 is delivered 21 to a scanner and is automatically given a distinctive identification (ID) number which can be used to identify the document in both the hard copy form and in storage. The ID number can be printed on the original of the document, in case it becomes necessary to refer to the original in the future. Preferably, the ID number is a 13 digit number of which two digits represent the particular scanner (in the event that the organization has more than one) or the department in which or for which the incoming documents are being processed, two digits represent the current year, three digits represent the day of the year and six digits represent the time (hour, minute and second).

The number is automatically provided by a time clock as each document is fed into the system. For reasons which will be discussed below, it is anticipated that most documents will be processed in a time of about two seconds each which means that the time-based ID number will be unique for each document. As the number is being printed on the document, it is supplied to non-volatile storage, such as a hard disk, for cross reference use with other information about the document.

While use of the ID number is clearly preferred, it would be possible to group documents, as by week or month received, and rely on other criteria to locate specific documents within each group. In such a case, the ID number would not be unique to each individual document but some other form of identification can enable reference to a specific document.

In order for the processing to be reliable, there are certain prerequisites for the documents, systems and procedures to allow the documents to be processed. Most of these are common to all conversion systems, not only those of the present invention. Currently available hardware devices are capable of performing these functions. The criteria are:

a. Each document should be easily readable, i.e., have reasonably good printing.
b. The print should be on one side of the page only. For documents having printing on both sides, it should be standard practice to use one side only.
c. The scanner should have a document feeder.
d. A copying machine should be available for either copying documents darker when the original is too light, or
copying damaged or odd-size documents not suitable for feeder input.
e. Character recognition software used with the system must be powerful and able to convert several different fonts appearing on one page.
f. Preferably the software should also be able to convert older type fonts and must be able to separate text and graphics appearing on the same page.

At this preliminary stage, pre-run information 22 can also be supplied to the apparatus to set, for example, the two-digit portion indicating the department for which documents are being processed. This is helpful if a single scanner is to be used for more than one department or if a scanner in one department is temporarily inoperative and one for another department is being used.

The documents are fed into the scanner, after or concurrently with assignment of the ID number, the scanner being of a type usable in optical character recognition (OCR) but without the usual recognition hardware or software. The scanner thus produces an output which is typically an electrical signal comprising a series of its of data representing successive lines taken from the image on the document. Each of the successive lines consists of a sequence of light and dark portions (without gray scales) which can be thought of as equivalent to pixels in a video display. Several of these "pixel lines" form a single line of typed or printed text on the document, the actual number of pixel lines (also referred to as "line art") needed or used to form a single line of text being a function of the resolution of the scanner.

In conventional OCR, software is commonly used to analyze immediately the characteristics of each group of pixel lines making up a line of text in an effort to "recognize" the individual characters and, after recognition, to replace the text line with code, such as ASCII code, which is then stored or imported into a word processing program. In one aspect of the present invention (FIG. 1), recognition of the full text is not attempted at this stage. Rather, the data referred to above as pixel lines is stored in that image form without conversion. In the other approach (FIG. 2), the full text is converted into code and is then stored in mass storage (e.g., optical disk) while the converted search words are stored, as suggested above, in a readily accessible form of non-volatile memory such as a hard disk. In this connection, memory such as random access memory, buffer storage and similar temporary forms of memory are referred to herein as either RAM or volatile memory and read/write memory such as hard disk, diskette, tape or other memory which can be relied upon to survive the deenergization of equipment is referred to as non-volatile memory.

The pixel line image is stored in a temporary memory such as RAM 24 and the ID number, having been generated in a code such as ASCII by the time clock or the like concurrently with the printing, is stored in code form and correlated in any convenient fashion with its associated document image.

As will be recognized, the image which is stored in this fashion includes any graphical, non-text material imprinted on the document as well as unusually large letters or designs, in addition to the patterns of the text. Commonly, incoming correspondence will include a letterhead having a company logo or initials thereon. At this stage 26 of the process, the image can be searched to determine if patterns indicative of a logo or other distinctive letterhead (generically referred to herein as a "logo") is present. This can be automatically performed by examining the top two to three inches of the document for characters which are larger than normal document fonts or have other distinctive characteristics. By "automatically" it is meant that the step can be performed by machine, i.e., by a suitably constructed and programmed computer of which examples are readily available in the marketplace. The term "automatically" will be used herein to mean "without human intervention" in addition to meaning that the step referred to is done routinely.

If such a logo is found, 28, a comparison 30 can be made to see if the sender's company logo matches a known logo from previous correspondence. This information can be useful in subsequent retrieval. For this purpose, a data table 32 including stored patterns of known logos is maintained correlated with the identification of the sending organization, the pattern information in the table 32 being in the same form as the signals produced by the scanner so that the scanner output can be compared with the table to see if a pattern match exists.

To seek a pattern match, a comparison is performed preferably using a system of the type produced by Benson Computer Research Corporation, McLean, Va. which utilizes a search engine employing parallel processing and in-memory data analysis for very rapid pattern comparison. If the letterhead/logo on a document is recognized, 34, an identification of the sender, including address, is attached, 36, to the ID number for that particular document for subsequent use as a search word. If no pattern match is found, a flag can be attached to the ID number for that document to indicate that fact, allowing human intervention to determine whether the logo pattern should be added to the existing table.

As will be discussed, the ID number and any additional information which is stored with that number, as well as search words to be described, are ultimately stored in code rather than image form. Such code is preferably stored on a hard disk while the images are ultimately stored in a mass store such a WORM (write once, read many times) optical disk. Meanwhile, all such data is held in RAM.

At this stage, the system enters into a process of selecting search words and other information from the remaining parts of the document to allow immediate electronic distribution as well as permanent storage of the documents which have specifically designated addressees and to permit subsequent retrieval on the basis of information contained in the document. Some of the techniques for doing these tasks are language- and custom-dependent, as will be discussed, and the techniques must thus be tailored to the languages and customs for the culture in which the system is intended to be used. A general principle in this embodiment is to attempt to recognize portions of the document which are likely to contain information of significance to subsequent retrieval before the document is converted into code and to then convert into code only specific search words within those recognized portions.

It is customary in many countries to have the date of the letter and information about the addressee isolated at the top of a letter following a logo, or in a paragraph which is relatively isolated from the remainder of the text. This part of the letter easily can be recognized from the relative proportion of text space to blank space without first converting the text into code. Once recognized, 38, this portion can be converted, identified as "date" and "addressee" information 40 and stored with the document ID. All known arrangements for writing a date can be stored in a data table for comparison with the document so that the date and its characteristics can be recognized.

If the date and addressee information cannot be recognized in a specific document, the ID for that document is flagged 42 for human intervention so that the date is manually added to the extent that it is available. In this context, the "addressee" would normally be either a specifically named person or a department within the overall organization. To facilitate identifying the addressee, a table can be maintained with individual and department names for comparison.

At this stage of the process, normally about two seconds or less after the document has been introduced into the scanner, enough information will have been determined (in most cases) for the system to send to the individual addressee, as by a conventional E-mail technique, notification 44 that a document has been received, from whom, and that the text is available from mass storage under a certain ID number. If desired, the image of the entire document can be transmitted to the addressee but a more efficient approach is to send only notification, allowing the intended recipient to access the image from mass storage.

In a similar fashion, the name of the individual sender, as distinguished from a company with which the individual might be employed, is usually readily recognizable, 46, near the end of the document page on which it appears. If recognizable, the sender's name and/or title is chosen routinely, 48, as one of the search words. Additionally, it will be recognized that the presence of the sender's name at the end is an indication that the page on which it appears is the last page of that specific document, while the presence of the addressee's name near the top indicates that the page is the first page. An indication of Attachments at the bottom can also be chosen to show that there is more to be associated with the letter.

Multiple page documents can be recognized by the absence of letterhead information on the second and subsequent pages and by the presence of a signature on a page other than the one with address information. It is important to correlate all subsequent pages with the first page so that when a multiple page document is found in a search, the first page is displayed and the user can then "leaf through" the document by sequentially displaying the subsequent pages.

If a specific document exhibits any problems with character recognition, 50, the search words and related material are stored and the ID flagged for human attention, 52. The human review 56 is for the purpose of determining the reasons for the problem, correcting them if possible and either retrying the machine processing or manually entering the desired information.

The next task, 54, is to identify by machine those words in the text of the document which are significant to the meaning of the document and which can be used as search words, apart from identification of the sender, addressee, etc. The manner in which this task will be accomplished is more language-dependent than the above. A more complete discussion of the text search word selection process follows with reference to FIG. 3. The chosen search words are converted to code, 58, stored with, or correlated with, the ID number and the image itself is transferred to the mass store. If more documents are to be processed, 60, the method starts again at 21.

Figure 2A:
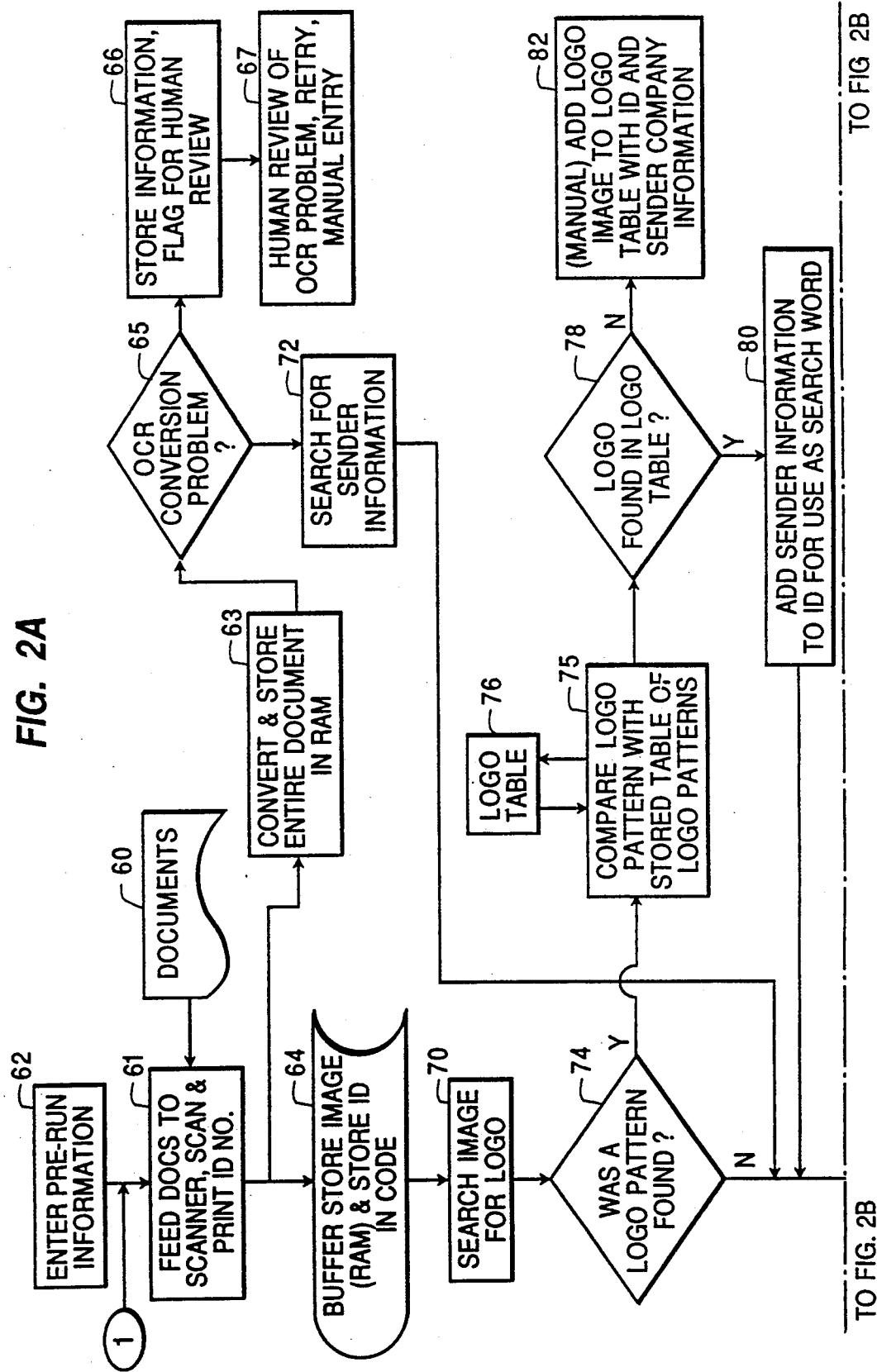
FIGS. 2A and 2B, taken together, constitute a flow diagram illustrating the steps of a second embodiment of a document processing method in accordance with the invention.
Figure 2B:
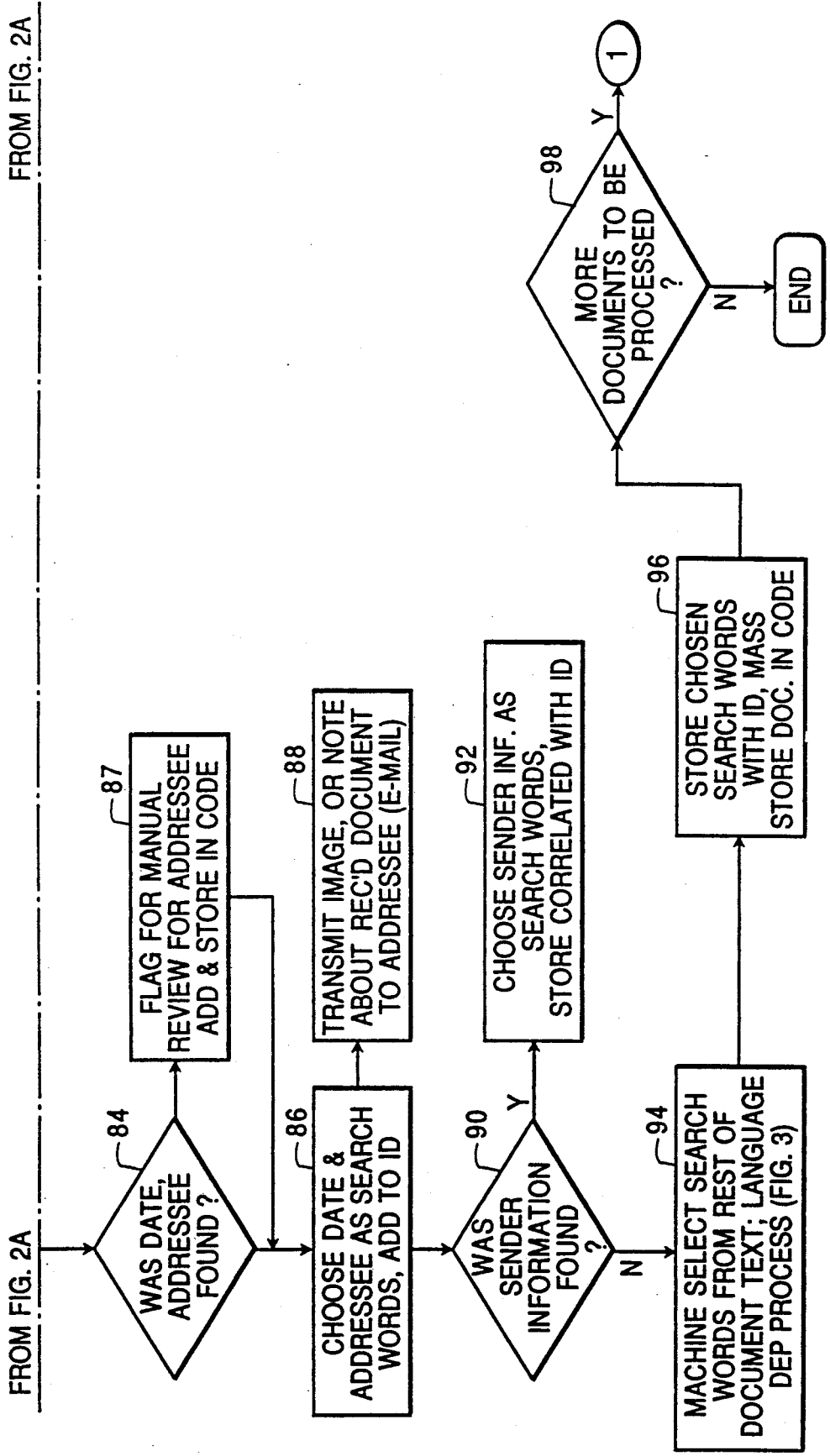

To summarize, the documents received by a company are analyzed to identify and store important words from various parts of each such document. In the example of a business letter, such information should include the following:

Sending organization (letterhead information)
Date of the letter
Addressee (company, organization)
Reference
Individual addressee (Dear Mr. -----)
Search words chosen from text
Presence of enclosure/annex
Individual sender FIG. 2 shows an alternative embodiment in which the input document text is converted, to the extent possible, at the beginning of the process while the scanning is being performed. This difference leads to a number of other changes throughout the process, although many of the steps are the same. The process of FIG. 2 will be briefly discussed with emphasis on the differences from FIG. 1.

To begin with, the feeding of documents 60 to scanner 61 and the insertion of pre-run information 62 is the same. However, after or concurrently with scanning, the entire document is converted, 63, to code by suitable conventional character recognition equipment and software and stored in volatile memory. As in FIG. 1, the image of the document is stored in RAM, 64, even though the conversion is accomplished. If there are any OCR conversion problems, 65, the ID number is flagged for human review, 66, and correction or manual entry, 67.

The image is searched for a logo pattern, 70, and if a logo is found, 74, its pattern is compared, 75, with patterns stored in a logo table 76. If found, 78, the information stored therein about the sender is added, 80, to the ID data stored. If not, it can be added manually, 82.

The system can be arranged to search for addressee and date information in either the image in RAM or the converted code in RAM, but the preferred method is to search in code, 72. If found, 84, these data are chosen, 86, as search words. If not, the document is flagged for human review, 87. Notification of the receipt of a document, or the entire document, can then be sent to the addressee, 88.

If date and sender information has been found, 90, it is added as search words, 92. The search word selection from the text is performed, 94, chosen words are stored and correlated with the ID number, 96, and the converted image data are stored in WORM or other mass store. As before, the ID and search word information is stored in a non-volatile, rewritable form of memory such as a hard disk. In this approach, storage of the image is possible together with full text conversion or conversion in part as well as conversion of search words into code. On the other hand, total conversion can be used only for the search for, and extraction of search words with, possibly, editing being performed to only the search words or only to the capital letters of the search words. The search in code in this case includes, e.g., date, addressee and sender.

Using this approach, the remainder of the converted text is not stored but is deleted.

Correction of incorrectly converted search words and/or rejections (words which cannot be recognized and converted) can also be reduced to two errors per rejection, or more for any characters following a capital letter. The capital letter itself would have to be correct for later ease and reliability of searching.

Figure 3:
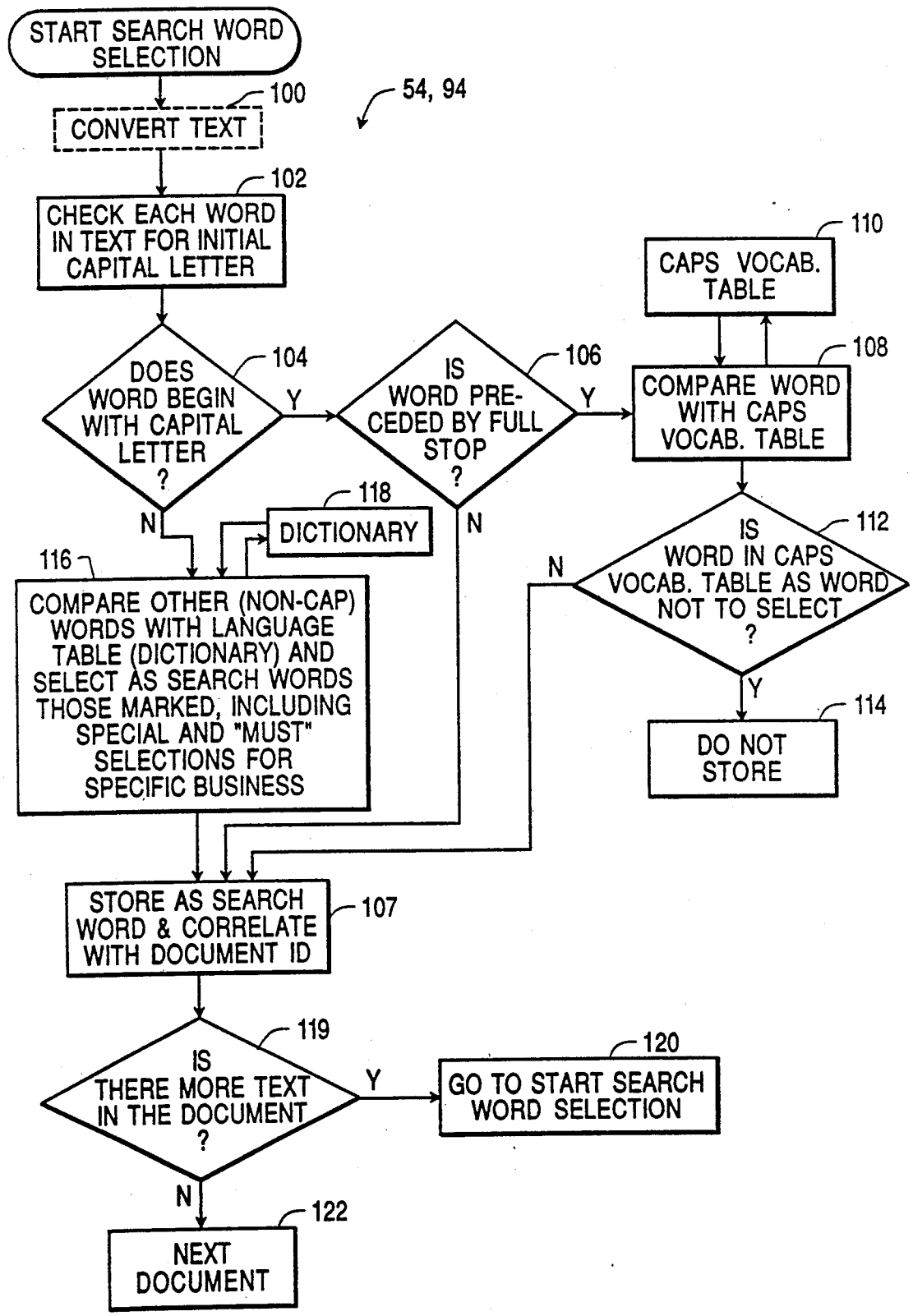
FIG. 3 is a flow diagram illustrating a search word selection process in accordance with the invention.

FIG. 3 illustrates a process for selecting search words from the text of a document automatically, i.e., without human intervention in the case of most documents, which is a very important part of the present invention. As indicated above, this process can be varied to some extent to take best advantage of characteristics of certain languages, but it need not be.

In documents written in German, for example, it is possible to make use of the fact that certain words are always capitalized, regardless of their positions in a sentence or other grammatical considerations. These words, called "Hauptworte", correspond to nouns in English and therefore are very likely to be important words for selection as search words. The system can thus be arranged to always select words beginning with capital letters, not at the beginning of a sentence, as search words.

The Hauptworte must, of course, be distinguished from other words which are capitalized only because they begin a sentence. It is a simple matter to identify words beginning a sentence since they always follow a full stop, i.e., a period, question mark or exclamation point, but it is then necessary to determine whether such words can be dismissed as unimportant or whether they should also be chosen as search words for storage. For this purpose, a data table is established which includes words in the subject language, German in this example, which are likely to appear in correspondence. The data table thus may contain as many as 50,000 words, in ASCII or similar code. When the data table is initially constructed, each of these words is marked (with code) as being in one of at least two categories, either as words which are not going to be of interest as search words (e.g., articles, prepositions, etc.) or words which will be of interest. Words which will be of high interest or which are special to the organization's business can form a third category. A comparison of each sentence-starting word with this vocabulary data table is a very quick and simple operation, somewhat analogous to a spell-check in a word processing program, and can be facilitated by using the Benson Computer Research Corporation parallel processing search technique which is extremely fast. Those words which are determined to be of no interest are thereafter ignored as to the current document and those which are of interest are stored as search words in a search data table which will be modified and will grow as time passes and as more documents are processed by the system. As will be recognized, if this search word-selection process is used in connection with the overall process FIG. 1, it will be necessary to convert the "suspected" search words into code before making a final determination of relevance, but in the system of FIG. 2 the words will already be in code.

The approach for selecting search words in the German language can be handled as follows in connection with the system of FIG. 1.

A. Define a capital letter as the first character of an uninterrupted string of characters following a full stop.
B. Convert into code only the first character of that string (not the entire word) which can be a capital or a digit.
C. Check to see if the converted character is a capital letter or a number.
D. If the character is a capital letter, then convert the entire word into code (e.g., ASCII). (This step can be delayed, if desired, until later to make use of a later time when less processing is being accomplished but it is then necessary to "flag" the image so that it can be recognized for later conversion.)
E. Perform all table checks, including a check against the above-mentioned table to see if the word is important (if not, the process ends) and, if it is, a check of the existing search word table to see if the search word already exists.
F. If the search word is not in the table, add it.

It will be apparent that such criteria can be changed to suit the business practices and policies of the organization; a government bureau will have quite different criteria from a manufacturing company. The general approach, however, is likely to be quite the same in that essential identifying material is extracted from each document such that the document can be located and retrieved again, as needed, with minimal recall of specific information. Furthermore, the essential identifying information is extracted from the vast majority of documents without human intervention.

Regarding the matter of indexing, no indexing is required when using a very fast computer search engine such as that developed and marketed by the Benson Computer Research Corporation, McLean, Va.

Mention was made above of a search word table which is to be developed. It is important to recognize some characteristics of such a table which are rather basic to the concepts disclosed herein. The table is to have the search words, in code form, with a connection between each search word and the ID of each document in which that search word was found. Thus, although a search word is found in ten documents, it is preferable to store that word only once in the table and associate it with the ID's of the ten documents, although this could be handled differently. It is important to be able to display the search words stored in this table, either totally or partially in order to facilitate a search for documents. Thus, if one wishes to find a particular letter received a year ago from the Siemens company, it is possible to display all search words associated with documents which were found to have the Siemens letterhead in the initial pattern matching within, e.g., a time frame of between 11 and 13 months earlier. Since the table is in code, this is a simple matter of doing a full-text search of the table itself, rejecting any search words not associated with that letterhead, and displaying the rest.

There will, of course, be those documents which cannot be handled automatically. Some will be in unrecognizable fonts or typefaces, some perhaps even handwritten, some will be (or will include) poor quality photocopies and some will be in a language other than one for which the system is set up. These documents will, nevertheless, be stored in image form and will be given an ID number, if using the ID approach. Each document from which nothing of consequence can be recognized by the processing equipment is identified by a unique form of code and all such documents are reviewed by a person to evaluate the problem and separately handle them in a more traditional way. In case the problem is a new font, the font is added to the system.

If English, rather than German, is the language being handled by the system, the approach differs to the extent that a greater percentage of the text is analyzed using comparison with a vocabulary table to identify nouns, etc. Words not following a full stop but having capital letters are likely to be proper nouns which have a high probability of usefulness as search words and are stored as such. However, since English nouns are not routinely capitalized, use of capitalization as an indicator of search word interest is somewhat less important than in German. The same can be said of French and many other languages.

Referring now to FIG. 3, the process shown therein can be employed in either of the embodiments of FIGS. 1 or 2 as blocks 54 or 94. The process starts with the conversion of text 100 earlier in the overall process in the FIG. 2 embodiment and will be assumed to have been done in the following discussion. Each word is checked, 102, to see if it has a capital letter. If it is found to start with a capital, 104, then a check is made to see if the initial character is preceded by a full stop, 106. If not, the word is assumed to be of sufficient relevance to be stored as a search word, 107. However, if it begins a sentence, the word is compared 108 with a "capitalized words vocabulary table" 110 which identifies words such as articles, prepositions and the like, or others, as defined by the user, such as certain Hauptworte in the German language, as being words not to select, 112, and such words are not stored, 114. All other words are assumed to be of sufficient relevance to store, 107.

As such words are searched for each document, they can be eliminated from the remainder of the text on the ground that a decision has been made about them. All other words are then compared, 116, with a dictionary 118 of the relevant language. This comparison can be facilitated by sorting the words into alphabetical order and eliminating redundancy. As described above, the dictionary is marked to identify words of interest and not of interest, the ones of interest being stored, 107. Remaining text, if any, 119, is examined, 120. If none, the system moves on to the next document, 122.

It is important for the users of the system to be able to add and delete search words when that appears desirable. Assume the situation in which an important letter is received and reviewed by the individual addressee. As he or she takes action regarding the letter, it may appear that one or more specific words of the letter are very important. The addressee calls up a display of the search words for that letter, adds the newly-recognized important words if they are not already present in the search word list, and perhaps deletes others which appear to be of less importance. By this technique, for only those documents which are likely to be most significant, the search word list is refined and improved. Documents of less importance thus, appropriately, receive less individual attention. In order to complement the automatic search word processing, it should also be possible to manually mark individually selected words of documents before the step of scanning so that the marked words are chosen as search words.

In addition, space can be provided in documents in order to enter special search words for conversion and later retrieval of image documents out of storage.

There are a number of ways character conversion to code can be accomplished.

1. The Benson Computer Research Corporation search engine, mentioned above, can be used combined with OCR conversion capabilities so as to use either one processor converting each text line to be converted in succession, or two or more processors can be used, in parallel with other processors concurrently converting different lines of text in the same document.

2. Only the first digit/character of a word, or of a group of characters, can be converted to determine whether that character is a capital letter, as mentioned above. If it is found to be a capital letter, either the remainder of the word is also converted or the image is saved for later conversion. This can be done if necessary in order to avoid delay, i.e., in order to keep the processing time per document within the preferred time of two seconds each for scanning and storing.

3. The images of documents are stored in succession without any conversion. Then, at a later time such as the end of the working day, all of the available data processing capability of the facility can be used for fast, parallel conversion and determination of search words. This approach is suitable in an installation where the processing equipment used for the document handling is expected to also perform other computing functions for the company and it can also be employed, if necessary, to keep within the two second processing time per document.

Grouping search words by logos of companies, or correlating search words with those companies with the ID numbers or other identifiers, permits a display of search words by company when the user of the system is in doubt about what search words to use and for what time periods. These search words should thus be displayable for certain time frames in which they were actually used, e.g.

Mr. Wagner wrote and appears in May and June
Mr. Dempsey wrote and appears in April and June.

A usable approach to determine whether or not a capital letter is located at the beginning of a word during line art scanning is to register all first pixels appearing within a line of characters. While this approach will definitely encompass all capital letters it will also involve non-capital letters and numerics occupying the same sites. Nevertheless, this approach will eliminate all small cited non-capital letters for matters of conversion, for determining whether or not they are capital letters.

In order to better the performance of the character recognition program, it is possible to provide, for instance, three character recognition programs to convert the identical search words in parallel and use a majority vote in the event of a failure to convert or doubt about the correctness of conversion (i.e., 2 out of three).

Figure 4:
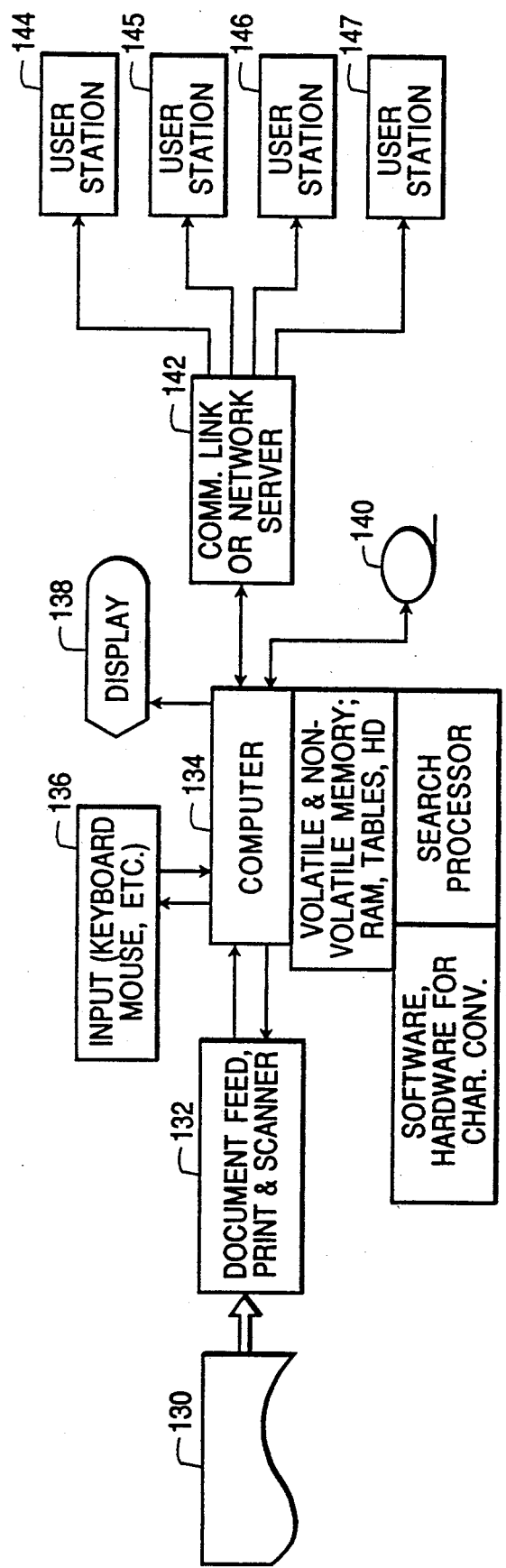
FIG. 4 is a block diagram of a system in accordance with the invention.

FIG. 4 shows a rather simplified diagram of a system in accordance with the present invention. It will be recognized by those skilled in the art from the above description that the most important aspects of the present invention reside in the software and the system configuration rather than in hardware since each piece of hardware is individually available and is capable of performing the necessary steps of the method without modification. However, in order to be sure that the actual configuration is clear, the system is shown in block form in FIG. 4.

Documents 130 are delivered to a scanner 132 which is preferably accompanied by a time-clock printer to provide unique document identification, as described above, and has a document feeder. Scanner 132 provides the scan data to a computer 134 which is the "heart" of the system in the sense of controlling the sequence of events and the communication between various components. As such, it is provided with volatile and non-volatile memory of adequate capacity to allow the necessary processing, hold the programs and store the tables which are used in connection with the present invention. In addition, the computer 134 has, either as an integral part or as a cooperating processor which could be a separate computer, the necessary hardware and software for character conversion as well as a search engine such as the Benson parallel processor mentioned above. The computer also has the customary keyboard or other input device 136 and a display 138.

Computer 134 is provided with a bidirectional communication bus for data transfer to and from mass storage equipment 140, such as a "juke box" CD-ROM drive for data retrieval which may be part of, or in addition to, apparatus for storing newly processed data on the mass storage media.

A network server or other form of communications link 142 provides bidirectional communication between computer 134 and a plurality of user stations represented by stations 144-147 which constitute the apparatus of the addressees in the foregoing discussion. Normally, each such station will have a terminal or a personal computer giving access to the system, including memory to which messages can be delivered. Through link 142, the user stations can receive information about documents processed and stored by the system and can obtain access to any of the data stored in mass store 140 as well as the search information, including lists of search words and the like, discussed above.

In view of the extensive discussion of the method of the invention above, it does not appear to be necessary to further discuss the operation of the system of FIG. 4.

Figure 5:
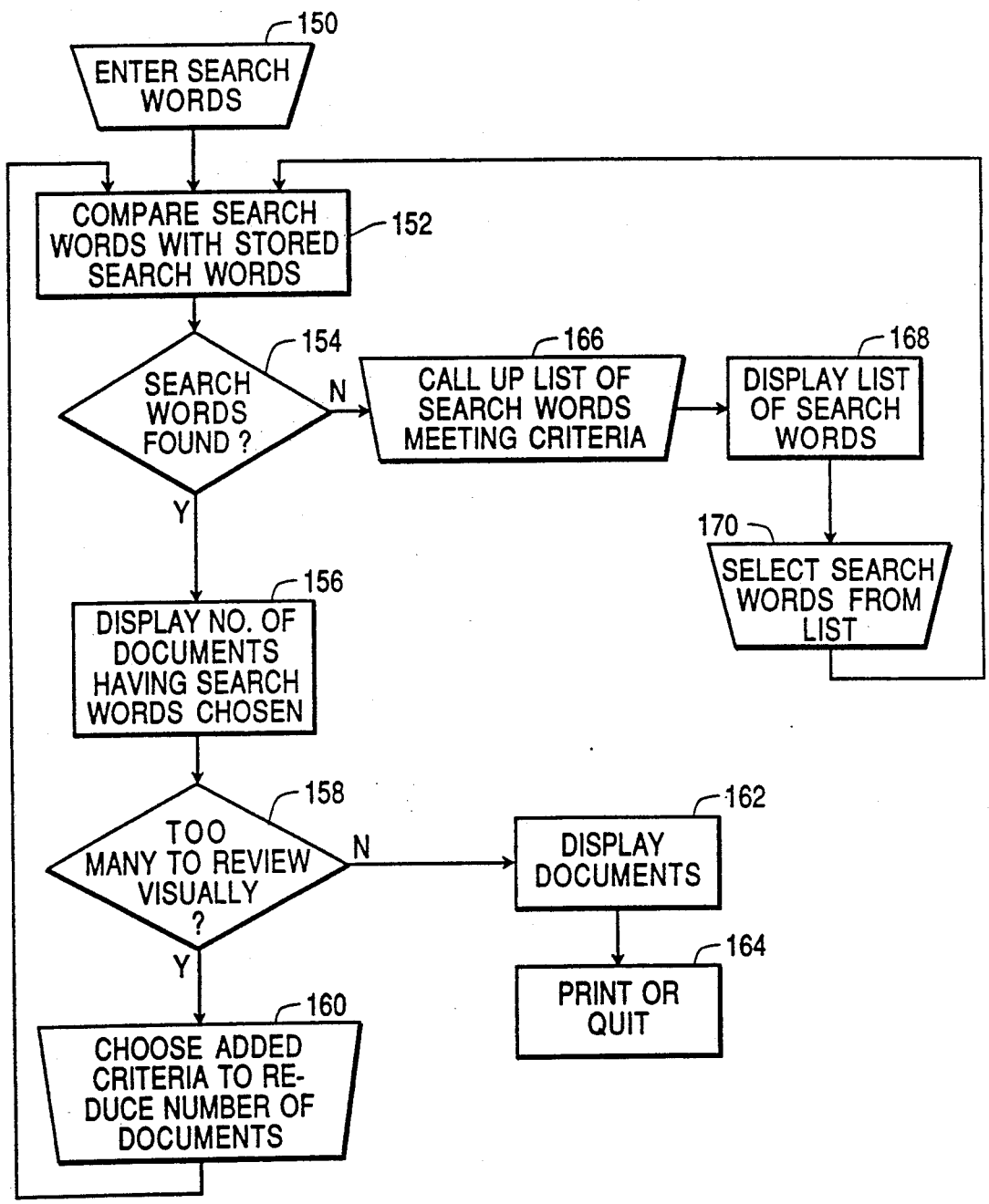
FIG. 5 is a flow diagram illustrating a retrieval method in accordance with the invention.

FIG. 5 shows the general approach for retrieving one or more documents stored in accordance with the present invention, although much of the retrieval technique will have been apparent from the above description. It will, for example, be obvious from the above that the purpose of extracting and storing the search words is to provide an efficient "handle" by which the documents can be found again. Thus, to begin a search, one enters into the computer 136 one or more search words, 150. The search word or words entered can simply be recalled from the memory of the person doing the searching, as will frequently be the case. For example, if a person at station 146 is seeking a letter about a matter relating to a rear axle, he or she might enter the words "rear axle" as the search words.

The entered search words are compared, 152, with search words stored in the memory associated with the computer 134. If a match is found, 154, the computer displays, 156, at the user station a number of documents found with that word or combination of words. The number may be too large for expeditious review, 158, in which case the user can elect, 160, to restrict the search to letters only from the Volkswagen company, whereupon the comparison is made again. When the number of documents is reduced to one or at least to a reasonable number for review, the documents can be displayed and visually reviewed until the desired one is located. The user can then choose to have the document printed or can simply learn the needed information from the display and quit, 164.

If the search word initially chosen results in nothing being found, 154, the user can ask, 166, for a display of all search words involving, for example, correspondence from the Volkswagen company. Review of this display, 168, might result in recognition of the word "differential" which could have been used in the letter. That word is chosen, 170, and a comparison, 152, is conducted using that term, resulting in locating the desired document.

It is important for the comparison 152 to be done in such a way that not an exact match need exist for the system to regard it as a "hit". This is especially important when searching for the names of individuals which can have variable spelling. This is possible by partial match.

While certain advantageous embodiments have been chosen to illustrate the invention, it will be understood by those skilled in the art that various modifications can be made therein without departing from the scope of the invention as defined by the appended claims.

What is claimed is:

1. A method of retrievably storing contents of a plurality of documents having images imprinted thereon and wherein images imprinted on at lest some of said documents include log designs which identify organizations originating the documents, including the steps of
    optically scanning the documents to form a digital representation of the images on the documents;
    automatically assigning an identification to each document and to the image representation of each document;
    automatically machine-selecting search words from the image representation of each document to be used in locating the document from mass storage;
    converting the selected search words to code;
    correlating the converted search words with the identification of the document from which the search words were selected,
    storing the converted search words in code in a non-volatile memory;
    storing in mass storage the image representation of each document
    forming a logo table of stored images of logo designs identifying the organizations together with information in code form about the sender employing each such design,
    when a document having a design is scanned, conducting a pattern search of the stored images in the logo table to seek a match between the scanned design and a stored image,
    when a pattern match is found, retrieving and correlating with the identification of the document the identifying organization information associated with the matched pattern from the logo table, and
    when a match is not found, flagging the document for manual addition of the design and identifying company information to the logo table.

2. A method according to claim 1 and further comprising defining a search word partial match as a match between a predetermined percentage of characters in the search word and the word stored int he non-volatile recalling documents associated with stored words located in the search by a partial match.

3. A method according to claim 1 and further comprising converting the content of a selected document located in the search into code.

4. A method according to claim 1 wherein the step of storing in mass storage is performed immediately following the step of scanning, and the steps of selecting search words and converting the selected search words are performed at a subsequent time to efficiently utilize character recognition and conversion machine capability.

5. A method according to claim 1 and further comprising
    recalling from non-volatile memory into volatile memory and displaying a list of search words stored in the memory,
    manually editing the list of search words.

6. A method according to claim 5 including the step of
    recalling from mass storage and displaying a selected document,
    and wherein the list of search words recalled and displayed includes words associated only with the displayed selected document.

7. A method according to claim 1 and further comprising manually marking selected words of documents before the step of scanning so that marked words are chosen as search words.

8. A method according to claim 1 and including, in the step of automatically selecting search words,
    determining the existence and location of addressee information on documents containing addressee information, and including that addressee information among the selected search words.

9. A method according to claim 8 and including, in the step of automatically selecting search words,
    determining the existence and location of sender identifying information on documents containing sender identifying information, and including that sender identifying information among the selected search words.

10. A method according to claim 1 wherein the step of storing includes storing the identification in code in addition to the converted search words.

11. A method according to claim 10 wherein said identification of the document in image is a unique identification number.

12. A method of retrievably storing contents of a plurality of documents having images imprinted thereon, at least some of said documents including logo designs which identify organizations originating the documents, including the steps of optically scanning the documents to form a digital representation of the images on the documents;

automatically assigning a unique identification number to each image representation of each document;

automatically machine-selecting search words from each document to be used in locating the document from mass storage;

converting the selected search words to code;

correlating the converted search words with the identification of the document in image from which the search words were selected, storing the converted search words and identification in code in a non-volatile memory; and storing in mass storage the image representation of each document; and searching for a document by the steps of selecting a search word, entering into volatile memory the search word in code, comparing the search word with search words stored in the non-volatile memory until a match is found, recalling from mass storage the image representations of those documents having identification numbers associated with the matched search word in the non-volatile memory, displaying an image thereof;

forming a logo table of stored images of logo designs identifying the organizations together with information in code form about the sender employing each such design, when a document having a design is scanned, conducting a pattern search of the stored images in the logo table to seek a match between the scanned design and a stored image, when a pattern match is found, retrieving and correlating with the identification of the document the identifying organization information associated with the matched pattern from the logo table, and when a match is not found, flagging the document for manual addition of the design and identifying company information to the logo table.

13. A method of retrievably storing contents of a plurality of documents having images imprinted thereon comprising optically scanning the documents to form a digital representation of the images on the documents wherein the digital representation of each document includes a plurality of pixel lines forming lines of characters in the image;

automatically assigning an identification to each image representation of each document;

automatically machine-selecting search words from each document to be used in locating the document from mass storage including evaluating the first pixel line in each character line to detect characters having the height characteristics of capital letters, and evaluating each detected character to determine if it is a capital letter;

converting the selected search words to code;

correlating the converted search words with the identification of the document in image from which the search words were selected, storing the converted search words and identification in code in a non-volatile memory; and storing in mass storage the image representation of each document.

14. A method according to claim 13 which includes recognizing each group of characters separated from other characters in the same character line as a word, and immediately converting into code the first letter of each word.

15. A method according to claim 13 which includes recognizing each group of characters separated from other characters in the same character line as a word, and selecting as a search word each word so recognized which has a capital letter.

16. A method according to claim 15 and including immediately converting into code each search word so selected.

17. A method according to claim 15 and including waiting until a subsequent time at which computing machine usage is low and then converting into code each search word so selected.

18. A method according to claim 17 and further comprising defining a search word partial match as a match between a predetermined percentage of characters in the search word and the word stored in the non-volatile memory, and recalling documents associated with stored words located in the search by a partial match.

19. A method of retrievably storing contents of a plurality of documents having images imprinted thereon and wherein images imprinted on at least some of said documents include log designs which identify organizations originating the documents, including the steps of optically scanning the documents to form a digital representation of the images on the documents;

automatically assigning an identification to each document and to the image representation of each document;

selecting search words from the image representation of each document to be used in locating the document from mass storage;

converting the selected search words to code;

correlating the converted search words with the identification of the document from which the search words were selected, storing the converted search words in code in a non-volatile memory;

storing in mass storage the image representation of each document forming a logo table of stored images of logo designs identifying the organizations together with information in code form about the sender employing each such design, when a document having a design is scanned, conducting a pattern search of the stored images in the logo table to seek a match between the scanned design and a stored image, when a pattern match is found, retrieving and correlating with the identification of the document the identifying organization information associated with the matched pattern from the logo table, and when a match is not found, flagging the document for manual addition of the design and identifying company information to the logo table.

20. A method of retrievably storing contents of a plurality of documents having images imprinted thereon and wherein images imprinted on at least some of said documents include logo designs which identify organizations originating the documents, including the steps of

- optically scanning the documents to form a digital representation of the images on the documents;
- selecting search words from the image representation of each document to be used in locating the document from mass storage;
- converting the selected search words to code;
- storing the converted search words in code in a nonvolatile memory;
- storing in mass storage the image representation of each document;
- forming a logo table of stored images of logo designs identifying the organizations together with information in code form about the sender employing each such design;
- when a document having a design is scanned, conducting a pattern search of the stored images in the logo table to seek a match between the scanned design and a stored image,
- when a pattern match is found, retrieving and correlating with the document the identifying organization information associated with the matched pattern from the logo table, and when a match is not found, flagging the document for manual addition of the design and identifying company information to the logo table.

21. A method of retrievably storing contents of a plurality of documents having images imprinted thereon comprising

- optically scanning the documents to form a digital representation of the images on the documents wherein the digital representation of each document includes a plurality of pixel lines forming lines of characters in the image;
- automatically machine-selecting search words from each document to be used in locating the document from mass storage including evaluating the first pixel line in each character line to detect characters having the height characteristics of capital letters, and evaluating each detected character to determine if it is a capital letter;
- converting the selected search words to code;
- storing the converted search words in code in a nonvolatile memory; and
- storing in mass storage the image representation of each document.

* * * * *